United States Patent [19]

Van Buytene

[11] Patent Number: 4,519,742
[45] Date of Patent: May 28, 1985

[54] APPARATUS FOR UTILIZING THE ENERGY PRESENT IN FLOWING WATER

[76] Inventor: Arend Van Buytene, Burmanlaan 66, 2241 JH Wassenaar, Netherlands

[21] Appl. No.: 451,148

[22] PCT Filed: Apr. 2, 1982

[86] PCT No.: PCT/NL82/00010
§ 371 Date: Dec. 1, 1982
§ 102(e) Date: Dec. 1, 1982

[87] PCT Pub. No.: WO82/03425
PCT Pub. Date: Oct. 14, 1982

[30] Foreign Application Priority Data
Apr. 2, 1981 [NL] Netherlands .................. 8101659

[51] Int. Cl.³ ............................................. F03B 7/00
[52] U.S. Cl. ........................................ 415/7; 415/2 R; 416/85; 416/87; 416/101
[58] Field of Search ............... 416/87, 101, 85, 88; 415/7, 2 R-4 R

[56] References Cited

U.S. PATENT DOCUMENTS

| | | | |
|---|---|---|---|
| 78,488 | 6/1868 | Shepard | 416/85 |
| 412,099 | 10/1889 | Keller | 416/101 |
| 515,883 | 3/1894 | Pelletier | 416/101 X |
| 553,796 | 1/1896 | DiVecchio et al. | 416/101 |
| 574,848 | 1/1897 | Kellogg | 416/101 |
| 825,101 | 1/1906 | Abbott | 416/101 X |
| 910,701 | 7/1906 | Macris | 416/23 |
| 930,956 | 8/1909 | Gracey | 416/101 |
| 960,403 | 6/1910 | Richter | 416/101 |
| 1,080,657 | 12/1913 | Richter | 416/101 |
| 1,090,751 | 3/1914 | Prouty | 416/101 X |
| 1,342,318 | 6/1920 | Yanacopoulos | 416/88 X |
| 1,361,111 | 12/1920 | Steele | 416/101 |
| 1,425,487 | 8/1922 | Jorgenson | 416/117 |
| 1,555,776 | 9/1925 | Twiford | 416/197 A X |
| 3,506,220 | 4/1970 | Sbrilli | 416/88 X |
| 3,927,330 | 12/1975 | Skorupinski | 290/54 |
| 4,301,377 | 11/1981 | Rydz | 415/7 X |

FOREIGN PATENT DOCUMENTS

| | | | |
|---|---|---|---|
| 20515 | 6/1905 | Austria | 416/101 |
| 474025 | 3/1929 | Fed. Rep. of Germany . | |
| 2800551 | 12/1979 | Fed. Rep. of Germany | 416/101 |
| 717946 | 1/1932 | France | 416/85 |
| 20943 | 10/1929 | Netherlands . | |

Primary Examiner—Everette A. Powell, Jr.
Attorney, Agent, or Firm—Murray Schaffer

[57] ABSTRACT

A rotatable shaft is provided with a plurality of blades each fixed at one end to the shaft and extending radially outwardly therefrom. Each of the blades has at least one gate or opening for the passage of fluid therethrough, and a slide movable between an inner position overlapping the blade and an outer position extending radially therefrom. The slide has means for opening said gate in one position and closing said gate in the other position. A cam for selectively moving said slide between said inner and outer positions is provided on a support for the shaft.

5 Claims, 3 Drawing Figures

APPARATUS FOR UTILIZING THE ENERGY PRESENT IN FLOWING WATER

BACKGROUND OF THE INVENTION

The invention relates to an apparatus for utilizing the energy present in flowing water, comprising a shaft on which a blade wheel is mounted.

Such apparatus is known in the embodiment of watermills having an undershotwheel or overshotwheel respectively. With such devices a gradient in the waterflow at the position of the blade wheel is always used, so that the blades at the downstream side of the bladewheel are not loaded by the resistance of the water present at that side.

Such a gradient does not prevail in a river or other flowing water. In order to permit the utilization of the energy present therein the apparatus according to the invention is characterised by a support in which a shaft is rotatably journalled. The support is adapted to be floatingly moored in the flowing water, and a blade wheel is mounted on the shaft. The blade wheel has radial blades, each provided with gate openings and with a slide or damper movable relative to the blade in the radial direction of the wheel. The slide is likewise gated and is biased, as with one or more springs towards a closed position. The gates are opened due to the rotation of the wheel through a cam profile which is secured to the support and cooperates with the outer end of the slide in the radial direction.

The cam profile causes the gates to be closed only in that portion of the path traversed by the blades in which the flowing water imparts a positive force to the blades, which causes a driving moment around the wheel shaft.

The blade wheel shaft may be positioned substantially horizontally as well as substantially vertically in the water. In the vertical position the blade wheel may be connected to the support such that the complete width of the blades, as measured in the direction of the shaft, is found below the water level. The cam profile then sees to it that the blades are opened when they move against the water flow direction. A vertical positioning is advantageous, if the water flow velocity is extremely high since the backwardly moving blades then impart a larger braking action than with horizontal positioning and prevents the rotary velocity of the shaft becoming too high.

With horizontal positioning of the shaft it is preferable that the shaft be mounted to the support such that it is situated some distance above the water level. The blades then experience a resistance because of the water mass if the force component of the water flow acting thereon is small, i.e. the angle of the blade with the flow direction is still small (when initially immersing the blade into the water) or is small again respectively (when the blade leaves the water). The air resistance experienced during the backward movement of the blades through the air is smaller due to the open position of the gates.

Of course the apparatus may be multiplied by providing a plurality of blade wheels on the shaft or on different shafts. The shaft or shafts are adapted to be coupled to the input shaft of an electric generator or other machine to be driven. If therewith a second blade wheel is mounted to the same shaft such that the blades thereof show a phase-shift relative to the blades of the first blade wheel, which phase-shift is equal to half the mutual angular spacing of the blades, a more constant driving moment around the shaft is obtained.

The invention will hereunder be illustrated with reference to the drawing, showing an embodiment as an example of the apparatus according to the invention.

DESCRIPTION OF THE INVENTION

Figure 1:
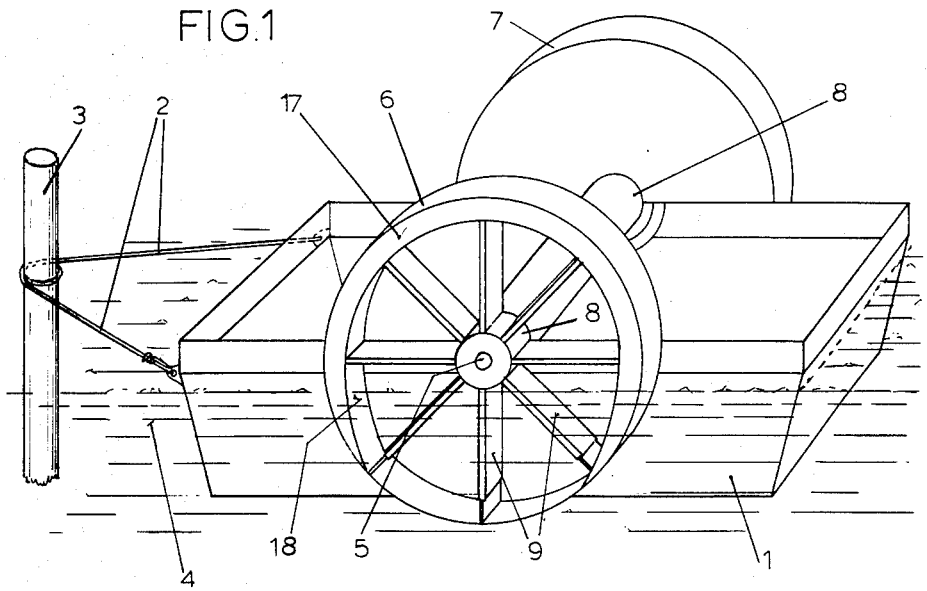
FIG. 1 shows schematically a support moored in a water stream and having a shaft provided with two blade wheels.

In FIG. 1 a support 1, e.g. a pontoon-shaped hollow body, is moored by cables 2, e.g. to a mooring post 3 in a water stream 4, e.g. a flowing river.

A shaft 5 has been provided in the upper part of the support 1 which is journalled in a manner not shown in bearings, so that the shaft is rotatable around its axis. A blade wheel 6 is secured to one end of the shaft 5, such that the blade wheel is situated in a vertical plane and is immersed for about two-third of the height of the lower half of the wheel in the water. In the embodiment shown in similar manner an identical blade-wheel 7 has been provided to the other end of the shaft. The blade wheel has a hub 8 to which radial blades 9 are secured. In the embodiment shown there are eight blades per wheel but this number may be varied.

Figure 3:
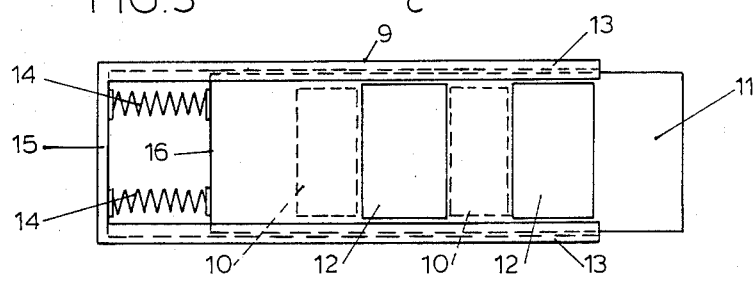
FIG. 3 is an elevation of a blade with a slide mounted therein.

A blade 9 is shown separately on an enlarged scale in FIG. 3. Said blade has two, in the embodiment shown, rectangular gates (i.e. apertures) indicated by broken lines in FIG. 3. A slide 11 likewise has gates 12 (i.e. apertures) of identical dimensions as the gates 10. Said slide 11 is slideable in guides 13 provided on the longitudinal edges of the blade. Said guides may be simple recesses in a thicker part of the blade surface, at the edges thereof, in which the edges of the slide 11 are received. The slide 11 is biased in the embodiment shown by two compression springs 14, which are contained in a hollow part of the blade between an end edge 15 of the blade and an end edge 16 of the slide.

Beside the blade wheel a plate or annulus 17 has been secured to the support 1, to which plate or annulus a cam profile ledge 18 is provided projecting towards the side where the blade wheel is mounted and extending substantially perpendicular to the plane of said blade or annulus. The ends of the blades 9 are in engagement with the cam profile 18 and are pressed against it by the springs 14.

Figure 2:
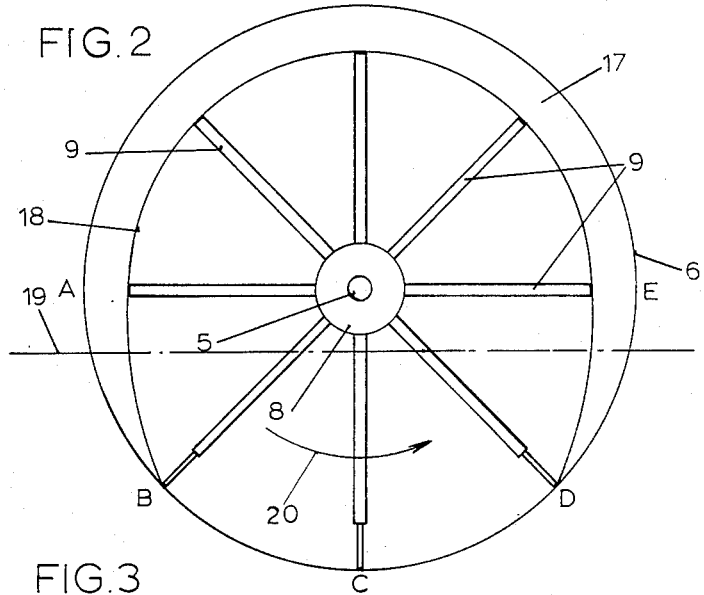
FIG. 2 is an elevation of a single blade wheel together with the cam profile for closing the slides.

In FIG. 2 a blade wheel is shown on an enlarged scale. The water line of the water 4 is indicated 19. Due to the force of the flowing water, the blade wheel 6, 7 is rotated according to the arrow 20. It appears from FIG. 2 that the cam profile ledge 18 extends substantially arcuate, i.e. according to a circular arc, in the part situated above the shaft 5. This part extends from its ends to a larger diameter through an angle of substantially 45°, the difference in diameter between the ends of the profile ledge 18 and the arcuate part thereof being equal to the distance along which the slides 11 are slideable. Due to the rotation of the wheel through the water, the slides 11 are urged inwardly by the profile 18 to a position in which the gates or apertures 10 and 12 respectively in the blade and in the slide respectively overlap each other.

When going from the point A in FIG. 2 to the point B, the slide of a blade is urged outwardly by the springs 14 and the gates in the blade are closed. From the point B the flowing water imparts the driving force to the blade, whereby a driving moment around the shaft 5 is generated. The driving force is maximum in the position C of a blade and thereafter gradually decreases up till point D. In the point D the gates in the slide are again opened by the profile 18 in the portion of the blade path, extending to the point E. Then the driving force of the water, which has already largely decreased, drops off completely, due to this opening action, and simultaneously the resistance experienced from the water behind the blade, as seen in the direction of movement, vanishes. In the portion from the point E to the point A in the upper part of the blade path the gates in the slides are open, so that the air resistance, experienced by the blades, is smaller due to the open gates.

As said, in the embodiment shown, two blade wheels have been mounted at both sides of the support. These wheel may be secured to the shaft with a phase shift equal to half the angular spacing between two blades relative to each other. Thereby the generated driving moment becomes more constant.

It will be clear that some form of known transmission, decelerating or accelerating, may be provided between the shaft 5 and an electric generator (not shown) installed in the support, for converting the generated energy into electric tension.

The number of blades per wheel may be different from that shown.

For a practical embodiment the blade wheels may have a diameter of substantially 8 meters, the slides a length of 4 meters, while the slides project beyond the blades when the gates are closed through a distance of about 75 cms. The width of the blades may be substantially one meter and the width of the operative area of the slides may be 90 cms.

The closed slides have an operative area for receiving the pressure of the flowing water of about $3.75 \times 1$ meter, that is 3.75 m$^2$. In constrast to windmills flow energy is always present for waterwheels mounted in the flowing water of a river.

I claim:

1. Apparatus for converting the energy in flowing water comprising a support adapted to be located in association with the flowing water, at least one paddle wheel comprising a rotatable shaft journaled on said support, a plurality of blades each fixed at one end to said shaft and extending radially outwardly therefrom, each of said blades having at least one opening for the passage of fluid therethrough, and a slide substantially coextensive with said blade and secured thereto for movement between an inner position overlapping said blade and an outer position partially overlapping said blade and partially extending radially therefrom, said slide having at least one opening, said openings being arranged to be in registry with the openings in said blade in the inner position allowing passages of water and out of registry with the openings in said blade in the other position whereby said openings in said blade are occluded preventing passage of water, spring means interposed between the inner ends of said blade and slide for normally biasing the slide in the outer position, and an arcuate cam ring fixed to said support and circumferentially surrounding said blades, said arcuate member having an inner surface at least in part slidably engaged by the outer end of said slide causing said slide to move reciprocally against said spring means between said inner and outer positions during rotation of said blades.

2. The apparatus according to claim 1 wherein said paddle apparatus includes a pair of wheels mounted on opposite sides of said support on a common shaft, said paddle wheels being circumferentially offset from one another such that the blades of one paddle wheel is phase-shifted relative to the blades of the other paddle wheel by an amount equal to half of the angular distance between adjacent blades.

3. The apparatus according to claim 1 wherein said blade comprises a sleeve having a rectangular cross section, and having an aligned opening in opposing said walls, and said slide comprises a planar member telescopingly inserted within said blade.

4. The apparatus according to claim 1 wherein said arcuate cam ring is open at least in part in that sector adapted to be within the water.

5. Apparatus for converting the energy in flowing water comprising a support adapted to be located in association with the flowing water, at least one paddle wheel comprising a rotatable shaft journaled on said support, a plurality of blades each fixed at one end to said shaft and extending radially outwardly therefrom, each of said blades having at least one opening for the passage of fluid therethrough, and a slide substantially coextensive with said blade and secured thereto for movement between an inner position overlapping said blade and an outer position partially overlapping said blade and partially extending radially therefrom, said slide having at least one opening, said openings being arranged to be in registry with the openings in said blade in the inner position allowing passages of water and out of registry with the openings in said blade in the outer position whereby said openings in said blade are occluded preventing passage of water, and an arcuate cam ring fixed to said support and circumferentially surrounding said blades, said arcuate member having an inner surface at least in part slidably engaged by the outer end of said slide causing said slide to move during rotation of said blades.

* * * * *